United States Patent [19]

Cole

[11] Patent Number: 4,471,928
[45] Date of Patent: Sep. 18, 1984

[54] EXTENDIBLE AIRFOIL TRACK ASSEMBLY

[75] Inventor: James B. Cole, Mercer Island, Wash.

[73] Assignee: The Boeing Company, Seattle, Wash.

[21] Appl. No.: 429,871

[22] Filed: Sep. 30, 1982

Related U.S. Application Data

[63] Continuation-in-part of Ser. No. 177,675, Aug. 13, 1980, abandoned.

[51] Int. Cl.³ .............................................. B64C 9/24
[52] U.S. Cl. .................................... 244/215; 244/216
[58] Field of Search ............... 244/213, 214, 215, 216, 244/218, 219; 254/95, 97; 74/29, 30, 89.2, 89.22

[56] References Cited

U.S. PATENT DOCUMENTS

| | | | |
|---|---|---|---|
| 1,917,428 | 7/1933 | Burnelli | 244/214 |
| 2,298,264 | 10/1942 | Czurles et al. | 244/214 |
| 2,702,676 | 2/1955 | Delaney, Jr. | 244/214 |
| 2,938,680 | 5/1960 | Greene et al. | 244/214 |
| 3,089,666 | 5/1963 | Quenzler | 244/214 |
| 4,286,649 | 9/1981 | Rokop et al. | 254/97 |

Primary Examiner—Galen L. Barefoot
Attorney, Agent, or Firm—H. Gus Hartmann; B. A. Donahue

[57] ABSTRACT

An actuation and extension mechanism for aerodynamically high-lift devices such as a wing leading edge slat or a wing trailing edge flap; wherein an aerodynamic panel is connected to one end of an extendible track member that is supported and guided by its other end through rollers fixedly mounted to wing rib structure. The track member incorporates a separate rack gear segment internally thereof as part of the extension or retraction mechanism and this combination of track and gear segment provides the primary support and drive means to the high-lift device, without compromising the structural strength, safety, or operational reliability of said combination.

7 Claims, 11 Drawing Figures

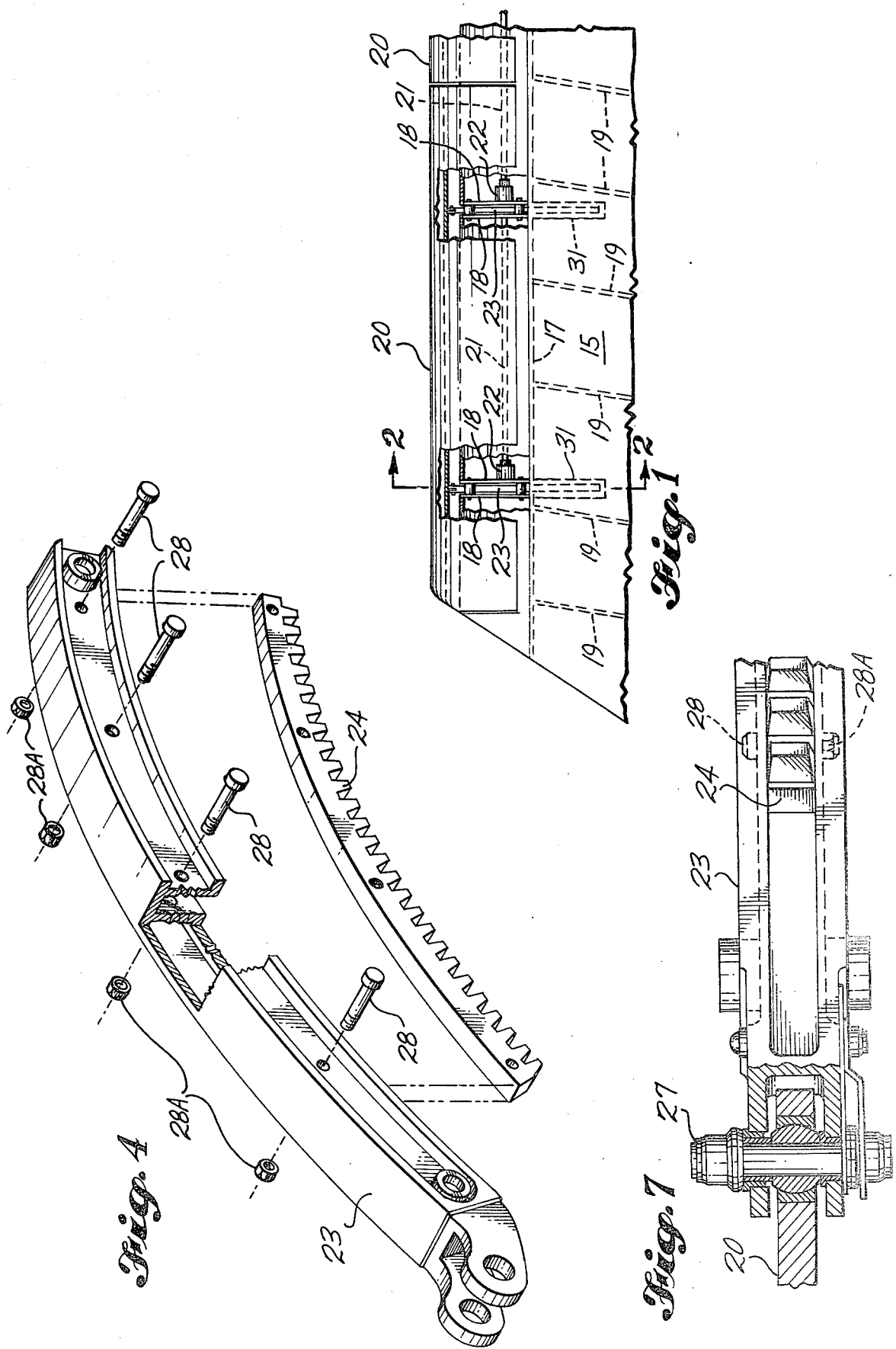

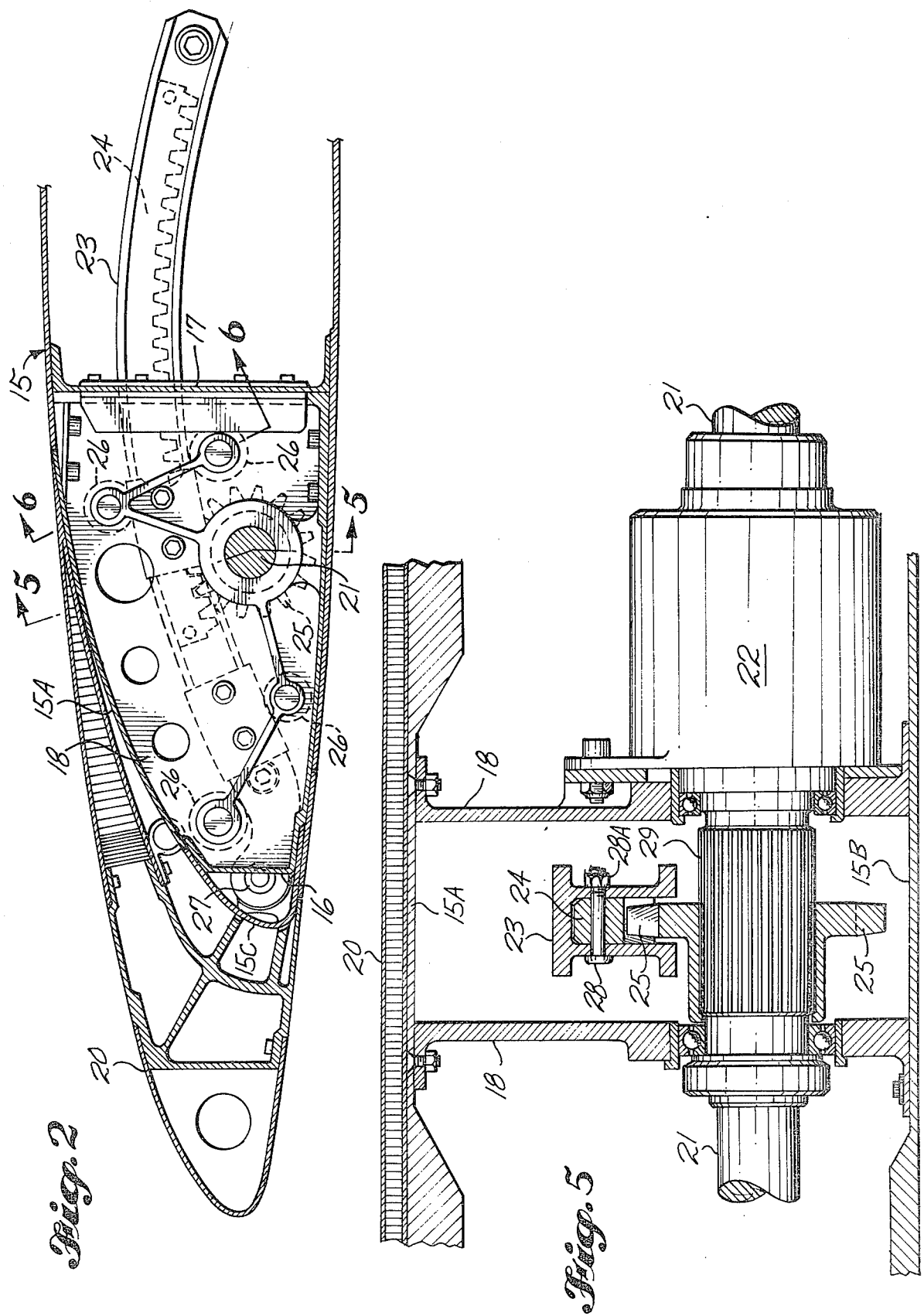

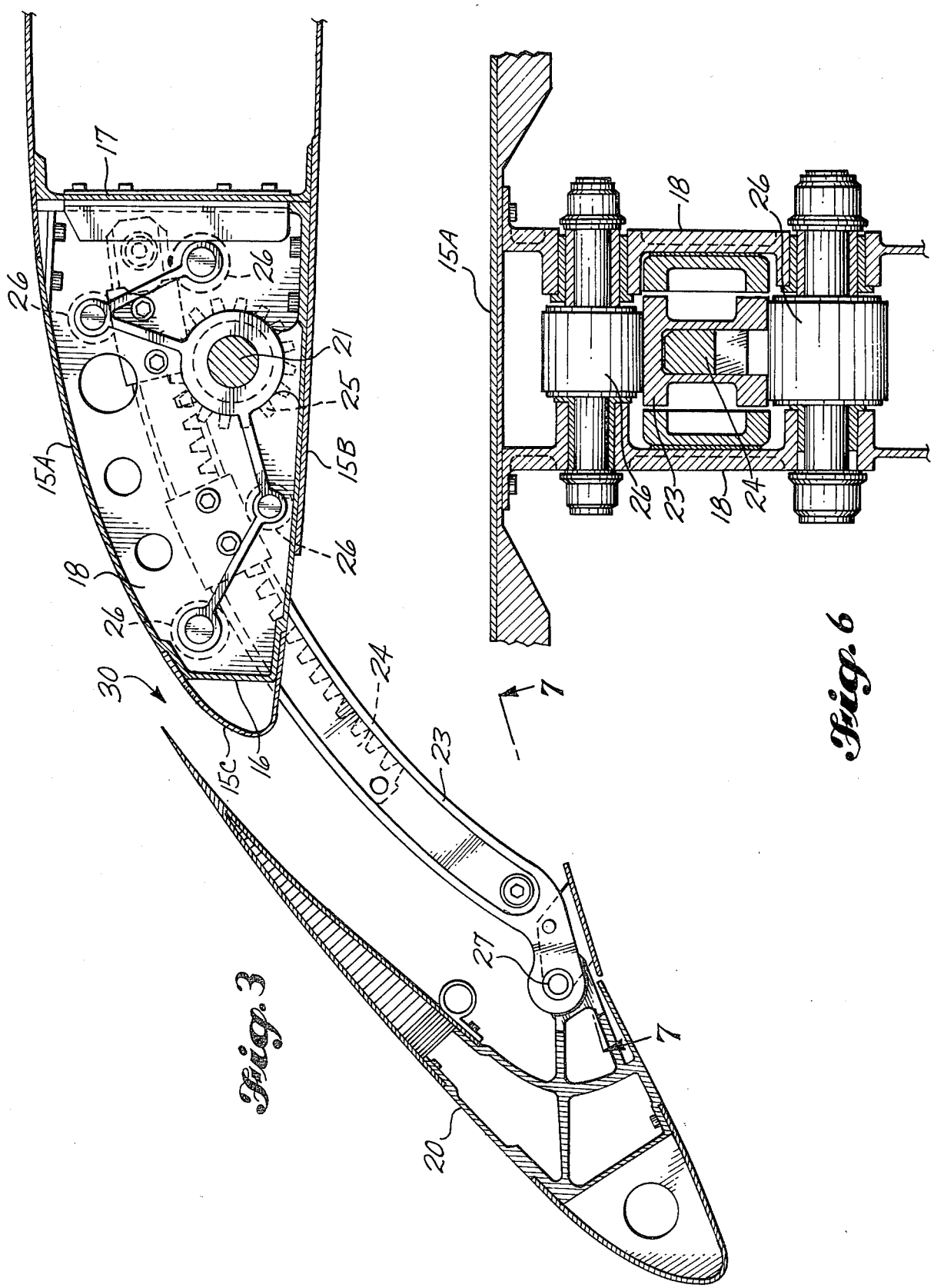

EXTENDIBLE AIRFOIL TRACK ASSEMBLY

SUMMARY OF THE INVENTION

This application is a continuation-in-part of application Ser. No. 177,675, filed Aug. 13, 1980, assigned to The Boeing Company and now abandoned.

The invention relates to aerodynamic high-lift devices which are extended by an actuation mechanism, to operating positions relative to a fixed airfoil section for improving low-speed aerodynamic performance of an airplane during landing or take off mode of operation; and more particularly to a main support track which separately incorporates a gear rack segmenet, this combination providing for support and actuation of the aerodynamic device relative to the fixed airfoil section.

In the generally known actuation system for wing leading edge slats or trailing edge flaps, the following type of units are generally spaced apart spanwise along the length of a slat or flap panel: a pair of carrier rails or main support tracks; a pair of driving ball-screw jacks or linear actuators; and a pair of positioning or programming tracks. Another known actuation system has a slat support track with gear teeth cut into the lower surface for meshing with a pinion drive gear. However, because the track is the main support for the aerodynamic loads imposed on the operatively extended slat, any notches or irregularities in the lower surface of the track, such as for gear teeth, would set up a notch-stress condition that would compromise the structural strength and stress safety, which would be unacceptable for commercial passenger carrying airplanes. Therefore, in the present invention, the gear rack is made as a separate element of the track assembly, rather than an integral part of it, in order to prevent the propagation of a crack originating in the gear rack from spreading into the carrier rail or main support track for the extendible high-lift device and causing a serious structural failure.

An advantage of combining the separate elements of the track and gear rack segment, as taught by the present invention, eliminates the tooth notches from the main support member for the extendible high-lift device and also permits each element of the track assembly to be of a different material and heat treated differently so as to provide the optimum hardness and structural strength characteristic for stress safety.

An object of the invention is to position the gear rack segment up inside the channel of a hat-shaped cross section of the support track with the teeth facing down such that the inner facing sides of the interior channel form a raceway for maintaining a pinion drive gear, which is adapted to a gear meshing engagement with the gear rack, in said raceway; and to protect the gear teeth from accumulating dirt or material that would jam the gear meshing relationship with the pinion drive gear or otherwise damage them.

An advantage of positioning the gear rack segment up inside the channel of the hat-shaped cross section of the support track is that it allows the pinion drive gear to be positioned up higher into the wing cavity and reduces the possibility of protrusion or bulging from the lower surface of the wing to provide clearance. This vertical height compactness of the track assembly and pinion drive gear allows it to be contained in a most compact arrangement, such that it can be housed within the airfoil envelope of very thin airfoil sections that are utilized for high speed airplanes such as military fighter aircraft.

Another advantage is that the track assembly functions as both the structural support for the extendible high-lift device and the means of extension thereof; therefore, the installation of this combination of slat support track and gear rack segment reduces the number of cutouts through the fixed wing leading edge; whereas, with known actuating systems incorporating ball-screws or linear actuators, an additional pair of cutouts is required per slat panel, thereby increasing aerodynamic drag.

BRIEF DESCRIPTION OF THE DRAWINGS

FIG. 1 is a plan view of an outboard wing leading edge section with a spanwise series of slat panels.

FIG. 2 is a chordwise cross-sectional view taken along the lines 2—2 of FIG. 1 in the direction indicated and depicts a wing leading edge slat at its fully retracted position whereat it completes the leading edge profile of the wing airfoil section; and this slat position is generally for the cruise flight mode of airplane operation.

FIG. 3 is a view similar to FIG. 2 with the leading edge slat at a forward extended operating position whereat an aerodynamic slot is formed between the leading edge of the fixed wing structure and the trailing edge of the extended slat panel; and this slat position is generally used for the landing mode of airplane operation.

FIG. 4 is an exploded perspective view of the slat support track and an internally mounted gear rack segment.

FIG. 5 is a sectional view taken along the lines 5—5 of FIG. 2 in the direction indicated.

FIG. 6 is a sectional view taken along the line 6—6 of FIG. 2 in the direction indicated.

FIG. 7 is a lower plan sectional view taken along the lines 7—7 of FIG. 3 in the direction indicated.

DESCRIPTION OF THE PREFERRRED EMBODIMENT

Figure 11:
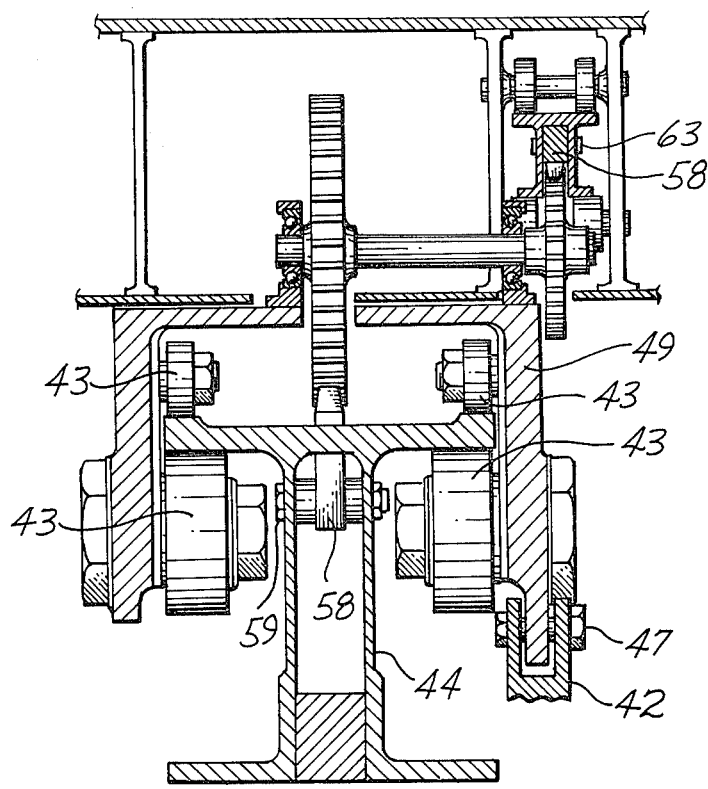
FIG. 11 is an enlarged sectional view taken along the line 11—11 of FIG. 9 in the direction indicated.

FIG. 1 is a plan view of an outboard, leading edge section of an airplane wing 15 having a front wing spar 17, leading edge ribs 18, main rib members 19 and a spanwise series of slat panels 20 along the wing leading edge. A power drive system is mounted spanwise along the front wing spar 17 for extending or retracting the slat panels 20 relative to a fixed wing leading edge; and comprises: a power drive unit (not shown) such as a hydraulic or electric drive motor for rotating a spanwise series of axially aligned shafts or torque tubes 21, at a relatively high speed. The high speed shafts 21 operate the extension or retraction mechanism of the slat panels 20 through a speed reducer and torque converter unit hereinafter referred to a rotary actuator 22. Each of the rotary actuators 22 is shown mounted adjacent to a pair of wing leading edge ribs 18 which straddle a slat support track 23 having a gear rack segment 24 and pinion drive gear 25 splined to the output drive shaft of the rotary actuator 22. The high speed shafts 21 operate through the rotary actuators 22 and function to controllably tie and synchronize one slat panel to its adjacent slat panel, without any additional slat drive synchronization mechanism being required.

FIG. 2 is a chordwise cross-sectional view taken in the direction indicated by the line 2—2 of FIG. 1 and shows a wing leading edge slat 20 at a fully retracted position whereat it completes the leading edge aerodynamic profile of the wing airfoil section for the cruise flight mode of airplane operation. Due to limited cross-sectional thickness of the airfoil at the location of the spanwise outboard slat panel 20, there is a limited stowage volume for a slat actuating mechanism. However, a preferred embodiment of the present invention, which relates to the combination of a slat support track 23 and a gear rack segment 24 that meshes with a pinion drive gear 25, is capable of being housed completely within the leading edge airfoil section envelope of the wing; and this combination is capable of providing the relatively large amount of travel required for a slat panel extension or retraction.

FIG. 3 is a chordwise cross-sectional view similar to FIG. 2 with the slat panel 20 extended, by the preferred embodiment of a track extension mechanism, to a forward operating position; whereat, an aerodynamic slot 30 is formed between the leading edge of the fixed wing structure and the trailing edge of the extended slat panel 20; and this slat position is generally used for the landing mode of airplane operation.

The fixed leading edge section of the wing comprises: an upper surface skin panel 15A, a lower surface skin panel 15B, and the upper and lower skin panels 15A and 15B are attached to a rigid leading edge nose structure 15C having a spanwise nose beam 16; and this entire structure is supported by chordwise wing ribs 18 which are fixedly attached to a spanwise structural member such as the front wing spar 17.

Each individual slat panel 20 is supported in the extended operating position shown in FIG. 3 by the curved track 23 which is mounted on rollers 26 having their rotational axis fixed to the wing rib 18. These curved slat support tracks 23 are main carrier tracks for the slat panels 20.

The forward end of these tracks 23 is pivotally connected at 27 to the slat panels 20; and the arcuate extension or retraction motion of the main carrier tracks 23 is about a theoretical center-of-rotation (not shown). There are two spanwise spaced main carrier tracks 23 for support of each individual slat panel 20; and the tracks 23 need not be located as shown in FIG. 1, but they could be located at the ends of the slat panel 20 or spaced spanwise apart at an optimum structural distance of approximately one-fourth of the length of a slat panel 20. When the slat panel 20 is in the fully retracted positon shown in FIG. 2, the main carrier tracks 23 protrude aft through a small opening in the front wing spar 17 and this protrusion of the track has a fluid-tight enclosure 31, shown in FIG. 1, because the interior of the wing is usually a fuel bay area.

Each individual slat panel 20 is supported in the extended position shown in FIG. 3 by the curved track 23 having an internally mounted gear rack segment 24 which engages the pinion drive gear 25.

FIG. 4 is an exploded perspective view of the slat support track 23 having a gear rack segment 24 as a separate element, mounted within a channel of the track cross section and fastened thereto by bolts 28 and nuts 28A. FIGS. 5, 6, and 7 are sectional views taken along the lines 5—5, 6—6, and 7—7 respectively of FIGS. 2 and 3.

With respect to the cross-sectional shape of the slat support or carrier track 23: as shown in the perspective view of FIG. 4 and the cross-sectional views of FIGS. 5, 6, and 11, there is an upper horizontally continuous material mass, a lower horizontally separated material mass and a vertical pair of parallel walls of material mass forming webs or stiffeners in between the upper and lower horizontal material masses; and a definitive description of this cross section is "a slotted I-shape" whose web section and lower flange are vertically split and spaced apart laterally to form a slot or an inverted U-shaped channel in the lower surface for insertion of the gear rack segment 24. Another definitive title of this cross section is "a hat section'.

In order for the carrier track 23 to function properly as the main support member for an extendible high-lift device such as the slat panel 20, a certain amount of material mass has to be concentrated in the highly stressed upper and lower outer fibers of the carrier track cross section; and the cross-sectional shape of the carrier track 23 should have a relatively high moment-of-inertia, preferably approaching that of an I-beam, in order to provide the maximum beam bending strength for a given height and mass of material.

A track having an inverted U-shaped cross section could also be broadly described as having upper and lower outer fibers, with a vertical pair of webs in between; however, strictly speaking, there is very little material mass concentrated in the lower cross-sectional area of the vertical pair of webs. Therefore, the term "inverted U-shaped" is not believed to be sufficiently definitive of a structurally acceptable cross-sectional shape that would have a moment-of-inertia approaching that of an I-beam; and without a certain amount of cross-sectional material mass concentrated in the lower portion of an inverted U-shaped track, it will not be strong enough to support the high-lift device with its imposed aerodynamic load when it is at its fully extended position relative to the airfoil. Therefore, strictly speaking, an inverted U-shaped cross-section track is not functionally saitsfactory as the main support member for said high-lift device.

From the standpoint of bending strength vs. weight, an I-beam is ideal i.e., the sectional properties, such as moment-of-inertia and cross-sectional distribution of material mass (where there is an equal amount of mass top and bottom and where the major portion of the cross-sectional mass is also concentrated in said top and bottom), make it a good support beam.

The fasteners, such as bolts 28 and nuts 28A which secure the gear rack segment 24 within the inverted U-shaped channel or slot of carrier track 23, are located at or near the low stressed neutral bending axis of the slotted I-shaped or hat-shaped cross section of the carrier track. If the fasteners were located at a different location, such as passing through the highly stressed flanges of the track, the bending strength characteristics of the carrier track would be seriously compromised.

The flanges of the slotted I-shaped or hat-shaped cross section of the carrier track provide the necessary contact area for the rollers 26 in order to satisfy bearing stress level requirements. An inverted U-shaped cross section may meet the bearing stress level requirement only at the expense of very thick walls and a consequent weight penalty.

The gear rack segment 24 is not made integral with the support track 23; and each of them: is of a different material, is heat treated differently, and has a different hardness and strength characteristic. The support track material is a 4340 MOD high heat treat alloy steel, high heat treated to 270-300 ksi. Further, it is desirable to keep them as separate elements; because the root of the gear tooth profile is susceptible to crack propagation when subjected to high tension stresses. From a safety standpoint, it is better if a fracture or crack is isolated solely to the gear rack segment 24. The present configuration isolates the gear rack segment 24 from the high tension stresses imposed on the outer fibers of the carrier track 23 lower surface; and this arrangement not only reduces the possibility of fatigue cracking, but if such cracks were to develop in the gear rack segment 24, they could not spread to the slat support track 23 and contribute to its failure. There are several fasteners 28, 28A, holding the gear rack segment 24 within the inverted U-shaped channel or slot of the slat support track 23, and even if a section of the gear rack segment 24 were to fail through fracture, it may still remain fastened in place and continue to operate satisfactorily. However, if the gear teeth were machined in the lower surface of the slat support track 23, then crack propagation from the tooth notches could take place and cause track 23 to fail; and because the track 23 is the primary aerodynamic load support member for the slat panel 20, the safety of the aircraft would be compromised. For these reasons, it would be undesirable to make these two elements integral; and their present arrangement precludes the possibility of crack propagation from the rack segment 24 to the support track 23, thereby preventing a serious structural failure.

Referring to FIGS. 1 and 5, the drive gear 25, track 23 and rollers 26 are centered spanwise between a pair of wing ribs 18 which provide a structurally straddled support. The axially aligned series of high speed shafts 21 rotate within the approximate range of 600 to 1,000 r.p.m. and go into and through actuators 22 which comprise a planetary gear mechanism of about a 200:1 reduction ratio; and which planetary gear mechanism rotates a splined output sleeve 29 at a relatively slow rate of speed. The actuator output sleeve 29 is splined to drive gear 25 which meshes with gear rack segment 24 to extend or retract the slat panel 20. The gear rack segment 24 is positioned within the inverted U-shaped channel or slot of the track 23 and located on the cross-sectional, vertical centerline of the track 23 in order to produce a symmetrical drive force for extension and retraction of the slat panel 20. An asymmetrical drive force e.g., such as that produced by a gear rack mounted to only one side of a track member, would produce unacceptable side loads, friction and driving forces. Further, if a pair of gear racks were straddle mounted, one on each side of a track member, such that a drive force was produced on both sides of the central track member, then synchronized or balanced gear tooth loading would present a problem in addition to an increase in weight and cost. Also, as shown in the cross-sectional views of FIGS. 5, 6, and 11, the track support rollers 26 (FIGS. 5, 6) and rollers 56 (FIG. 11), are supported by through bolts, i.e., bolts passing through a pair of support ribs, one on each side thereof, to provide for maximum load carrying ability. This straddle-mounted dual support contrasts with a cantilevered roller configuration which provides much less load carrying capability.

The spanwise series of high speed shafts 21 function to synchronize the extension or retraction sequence of the spanwise series of slat panels 20. One of the problems in getting maximum extension travel of a slat panel, from the fixed leading edge portion of a wing, is that as the crosssectional thickness of a wing airfoil section decreases, it becomes more and more difficult to design a simple slat actuating mechanism that will: operatively extend a slat panel to the distance shown in FIG. 3; function satisfactorily throughout the complete extension and retraction cycle; and still be capable of being stowed within the wing cavity area as shown in FIG. 2. It is conceivable that a ball-screw jack or other linear actuator, with one end pivotally connected to the slat panel and the other end connected to the front wing spar, as in generally known slat extension systems, could be used to produce a maximum slat extension similar to the present invention; however, the distance between the wing leading edge 15C and the front spar 17 is a fixed amount which limits the length of a linear actuator. This distance is usually inadequate for maximum extension even when the attachment points are located as far forward as possible in the slat nose structure, and as far aft as against the front spar 15. If this is done, the design is further compromised because the actuator attachments have poor accessibility and complicate the slat and spur structures. Therefore, in order to obtain a maximum extension similar to that of the present invention will usually require a telescoping type of actuator, i.e., a screw within a screw or a cylinder within a cylinder. These devices are heavier, more costly and less reliable than a conventional single stage extension unit. In contrast, maximum slat extension is no problem with a rack and pinion gear drive, as shown in the present invention, since the rotation of the pinion gear is unlimited and the gear rack may be extended to the full length of the support track. Another disadvantage of using linear actuators is the weight and cost of additional support ribs and attachment fittings which must be incorporated in the slat and fixed leading edge structures to mount each actuator. Further, it will also be evident that a substantial cutout will have to be made in the undersurface of the fixed leading edge portion of the wing for clearance of said actuators; and the penalties associated with these cutouts will be in addition to those made for the set of slat support tracks and the set of programming mechanisms. Cutouts in the fixed leading edge cause air flow irregularity and disrupt the airflow through the aerodynamic slot shown in FIG. 3 causing aerodynamical drag and poorer low speed performance.

Further, referring to FIGS. 2 to 5, it will be noted that the gear rack segment 24 is located up inside the inverted U-shaped channel or slot in the slat support track 23 and this allows the drive gear 25 to be raised up higher into the wing cavity so that it will not protrude below the lower surface of the wing. Referring to the outboard slat panel 20 shown in the plan view of FIG. 1, it is evident that the wings generally taper in plan-form and thickness toward the tip and the airfoil cross-sectional area forward of the front wing spar 17, is such that there is insufficient area for installing said known systems capable of producing the amount of slat travel or extension distance of the present invention, without extreme complexity.

The slat support track has to fit within the cross-sectional contour area of the wing airfoil section and there has to be a certain amount of space left at the top of the wing cavity for structural support material. Also, in order to aerodynamically program the slat panel extension positions, a certain amount of space, both above and below the track, is necessary for properly locating and mounting the rollers that support the track. The operating positions of the slat panel, for producing satisfactory aerodynamic characteristics, substantially determines the location of the track and rollers; and in most cases, the track will be positioned closer to the upper surface of the wing because of the curvature of the track which follows the upper surface curvature. Therefore, the largest space that remains in the airfoil envelope for locating an actuating mechanism is that area between the track and the lower surface of the wing. Even though this is the largest remaining area for placement of an actuating mechanism, it is still critical in depth because the most outboard airfoil cross-sectional contour, at the location of the outboard slat panel is quite slender in comparison to an inboard slat panel location where it is quite thick. Therefore, a close relationship between the center line of the track and axis of the drive gear, as shown in the present invention, is important since it provides a minimum depth actuator envelope for fitting the drive combination within the critical outboard cross-sectional area.

Referring to FIGS. 2 and 3, it can be seen that if the drive gear 25 had to engage gear teeth that were on the undersurface of the slat support track 23, the drive gear would have to be lowered and would possibly protrude from the lower surface of the wing. The method of combined construction of slat support track of the present invention, i.e., the cross-sectional slotted I-shaped or hat-shaped construction of track member 23 with a separate and internally mounted gear rack segment 24 makes possible a mechanical drive utilization of the track in addition to its primary purpose as the main structural support of the slat.

Figure 8:
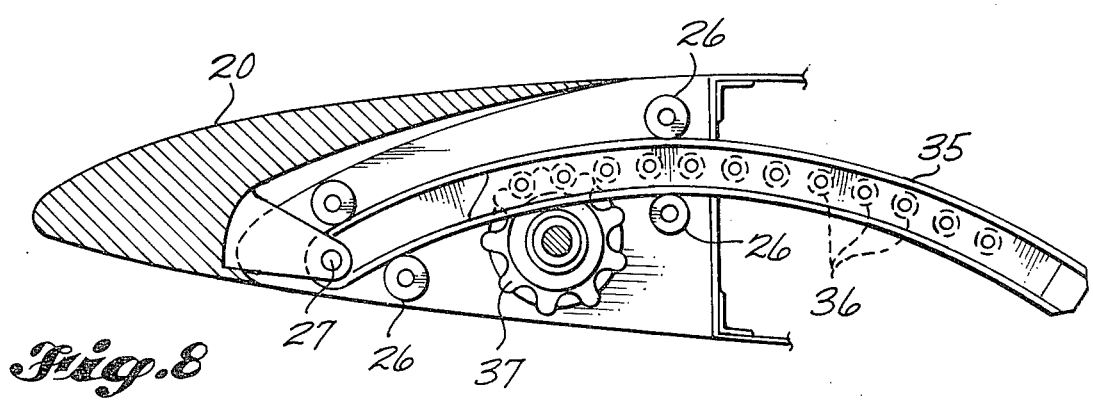
FIG. 8 is a view similar to FIG. 2 of a second embodiment of a slat extension mechanism showing a slat support track having an internally mounted series of rollers which are arranged to engage a sprocket drive gear.

FIG. 8 shows a second embodiment slat extension mechanism having a slat support or carrier track 35, similar to track 23 in FIG. 4, with a series of internally mounted rollers 36 forming a roller rack segment for meshing engagement with a pinion sprocket drive gear 37, similar to the rack and pinion arrangement of the first embodiment. The series of rollers 36 can be individually mounted within the slot of the track cross section; and fastened thereto by bolts and nuts located along or near the low stressed neutral bending axis of the track. Alternatively, the rollers 36 can be formed into a roller rack segment similar to the separate gear rack segment 24 of the first embodiment and this roller rack segment could then be fastened within the inverted U-shaped channel or slot of the track cross section by bolts and nuts also located along or near the low stressed neutral bending axis of the track as shown in the first embodiment.

An advantage of positioning the rollers up inside the slot of the carrier track 35 is that it prevents foreign material from jamming between the sprocket teeth and rollers; and also, improves the vertical height compactness of the carrier track assembly and drive sprocket 37, so that it can be housed within a limited stowage volume or minimum thickness airfoil section envelope.

Figure 9:
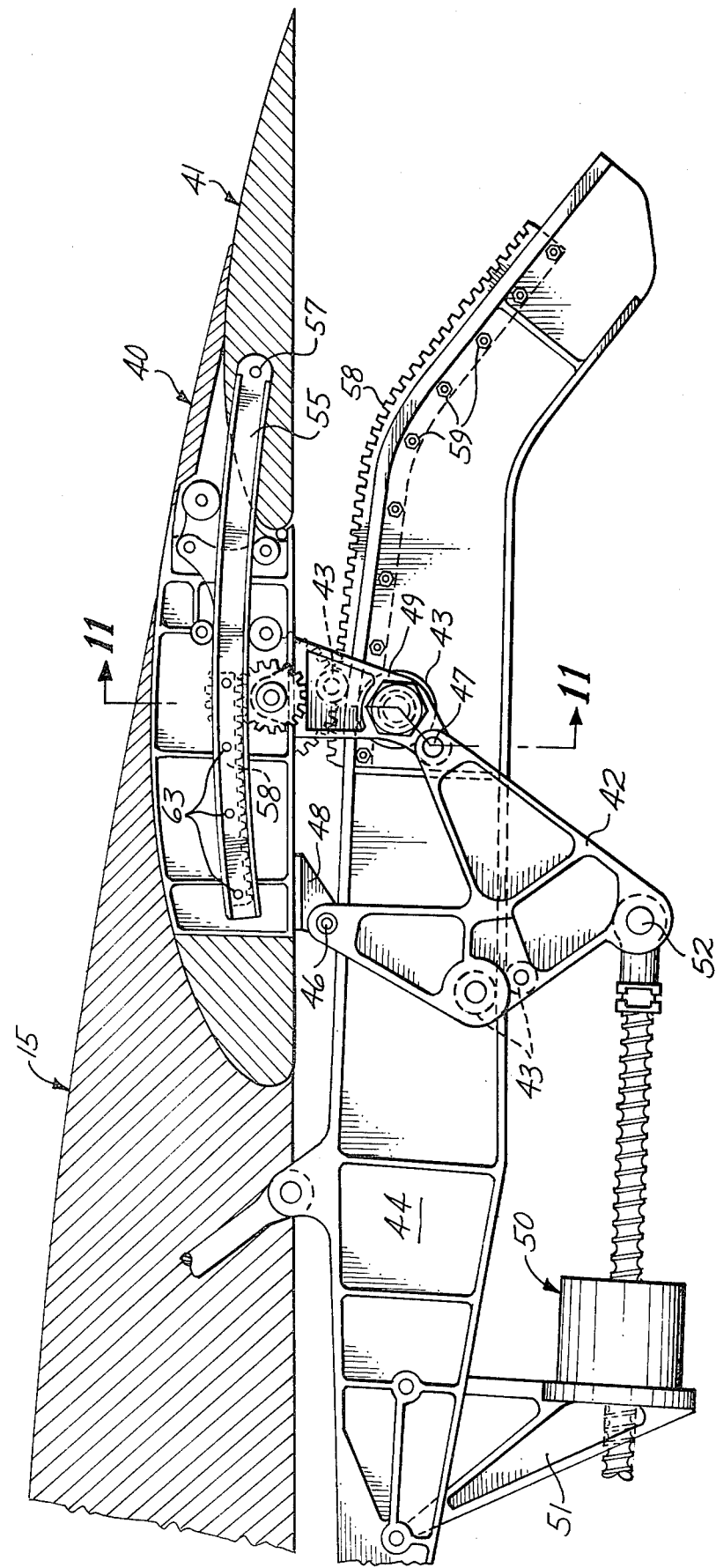
FIG. 9 is a chordwise cross-sectional view of a representative third embodiment showing an airfoil trailing edge section having a double flap assembly in its fully retracted position and an extension mechanism comprising a carrier track with an internally mounted gear rack segment for engaging a pinion drive gear.
Figure 10:
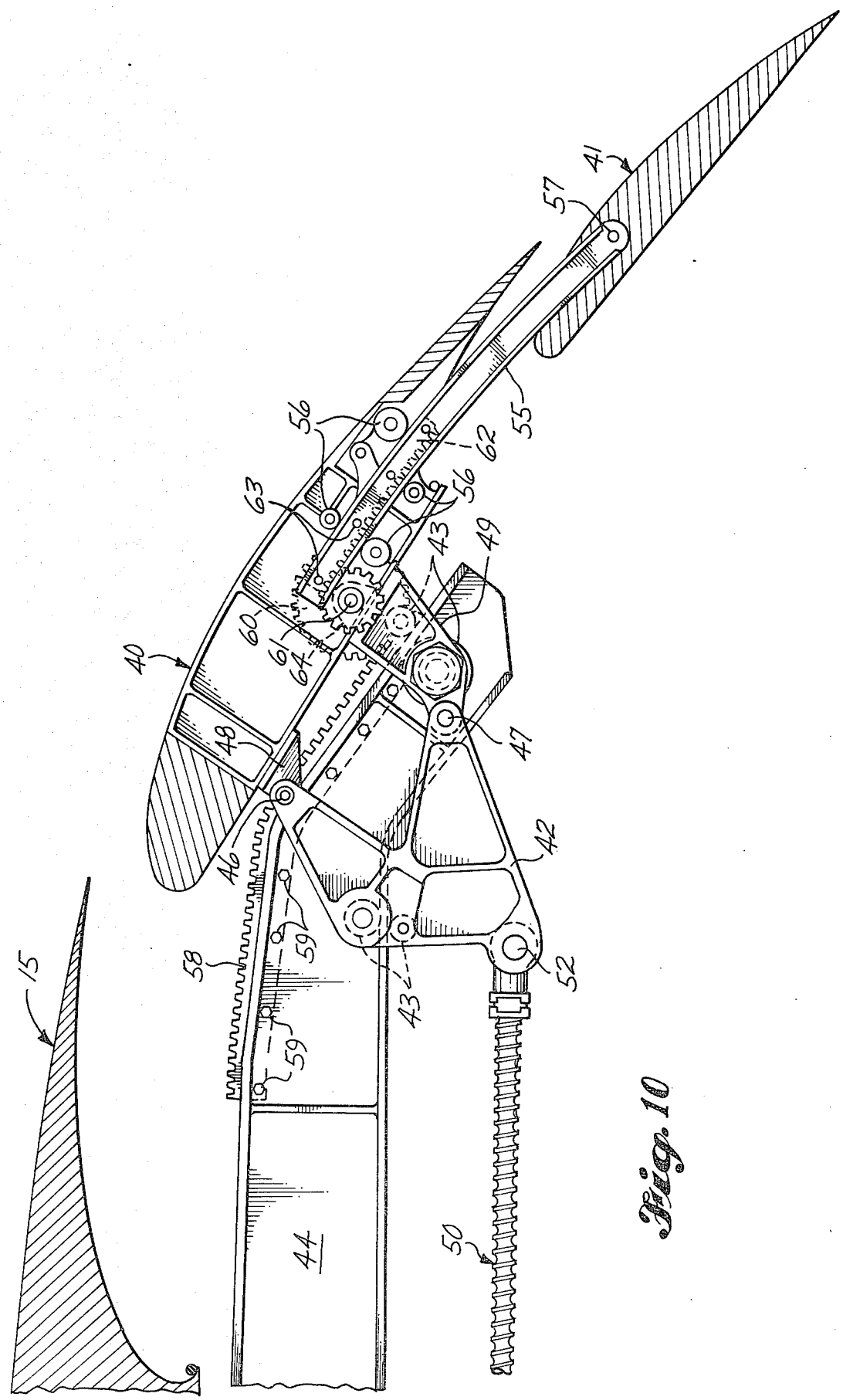
FIG. 10 is a view similar to FIG. 9 showing the airfoil flap assembly at a fully extended position, whereat the extension mechanism produces a double-slotted flap arrangement.

FIGS. 9 to 11 show a third embodiment of the present invention applied to an airplane wing 15 having a trailing edge flap installation. FIGS. 9 and 10 are chordwise cross-sectional views of a plural section flap at a fully retracted position and at a fully extended position, respectively; and FIG. 11 is an enlarged sectional view taken along the line 11—11 of FIG. 9 in the direction indicated. The double flap assembly extends along the trailing edge portion of the wing 15; and comprises: a fore flap section 40 and an aft flap section 41.

The flap actuating mechanism of the present invention provides a coordinated movement between the forward retracted position shown in FIG. 9 in which position the flap sections will be during cruise flight operation of an airplane; and the maximum rearwardly extended and downwardly deflected position in FIG. 10 in which position the flap sections will be during the approach and landing operation of the airplane. The flap sections, when in the position shown in FIG. 10 have been moved chordwise rearwardly to a maximum extent from their position in FIG. 9 and the flap sections have increased the effective chordwise expansion of the wing area considerably. Between the position of the flap sections shown in FIG. 9 and their position shown in FIG. 10, the flap sections will have been tilted downwardly relative to the wing 15, to a higher angle-of-incidence, so as to provide the maximum lift configuration of the flap assembly for use during the approach and landing operation of the airplane.

The forward flap section 40 is moved from the wing 15, by a first actuating mechanism; and the rear flap section 41 is moved from the forward flap section 40 by a second actuating mechanism. The purpose of the first and second actuating mechanism is to effect a chordwise translational movement of a flap section, relative to structure which supports it. In the case of the forward flap section 40, such chordwise movement will be relative to the wing 15; and with respect to the rear flap section 41, the chordwise movement will be with respect to the forward flap section 40. Since the rear flap section 41 is supported from the forward flap section 40, the rear flap section 41 will be moved chordwise rearward with respect to the wing 15, by the chordwise movement of the forward flap section 40 relative to the wing; and in addition, the rear flap section 41 will be moved chordwise relative to the forward flap section 40 and the wing 15, by the action of the second actuating mechanism which supports the rear flap section 41 from the forward flap section 40.

The first actuating mechanism for the fore flap section 40 comprises: a support carrier 42 mounted through rollers 43 to a cantilever beam 44 which is fixed structurally at its forward end (not shown) and through mounting lug 45 to the wing 15; said support carrier 42 is pivot connected at 46, 47 to lugs 48, 49 which are secured to the fore flap section 40; and a ball-screw actuator 50 secured at one end through a mounting bracket 51 to the cantilever beam 44, and at the other end through pivot connection 54 to the fore flap support carrier 42.

The second actuating mechanism for the aft flap section 41 comprises: a curved carrier track 55 mounted along its forward portion on rollers 56, having their rotational axis fixed to the fore flap 40, and at its rearward end at pivot connection 57 to the aft flap 41; and a dual rack and pinion drive mechanism for movement of the aft flap section 41 relative to the fore flap section 40.

The dual rack and pinion drive mechanism comprises: a first gear rack segment 58 fastened by bolts 59 to cantilever beam 44; a first pinion gear 60 having its rotational axis 61 fixed to the fore flap 40; a second gear rack segment 62 fastened, as a separate element, within the channel of the hat-shaped cross section carrier track 55 by bolts 63, similar to FIG. 4; a second pinion gear 64 axially aligned with said first pinion gear 60 and rotatable therewith; and said second pinion gear 64 engaging said first gear rack segment 58.

Control of the extension or retraction movement of the fore flap section 40 is effected by the ball-screw actuator 50 which may be hydraulically or electrically driven. As the ball-screw actuator 50 extends the fore flap section 40 from the stowed position shown in FIG. 9 to the fully extended position shown in FIG. 10, the fore flap support carrier 42 will first be principally extended chordwise rearwardly from the wing 15 along the horizontal portion of the cantilever beam 44 and then tilted to alter its angle-of-incidence relative to the wing 15 along the downwardly inclined portion of the cantilever beam 44. Extension movement of the fore flap section 40 will be accompanied by a coordinated clockwise rotation of the first and second pinion gears 60 and 64 respectively, and effected through meshing engagement with carrier track 55 and first gear rack segment 58, an aft reciprocation movement of the aft flap segment 41 to the double-slotted flap configuration shown in FIG. 10. Both flap sections 40 and 41 will move substantially conjointly to vary their angle-of-incidence relative to the wing 15. The angle-of-incidence of both flap sections 40 and 41 will increase during movement from the position of FIG. 9, through to the position of FIG. 10; and conversely, the angle-of-incidence of both flap sections 40 and 41 will decrease as they are moved from their position of FIG. 10, through to their position of FIG. 9.

As shown in FIG. 11, the carrier track assembly and support rollers are mounted between a pair of ribs 54.

With respect to the cross-sectional shape of the carrier track 55, it is similar to that shown and described with respect to the first embodiment i.e., the definitive description of this cross section is "a slotted I-shape" or a "hat-section" with a relatively high moment-of-inertia approaching that of an I-beam. Also, the fasteners, such as through bolt 63, which secure the gear rack segment 62 within the inverted U-shaped channel or slot of the carrier track 55, are located at or near the low stressed neutral axis of the slotted I-shaped or hat-shaped cross section of the carrier track 55. Further, as described in the first embodiment, the flanges of the cross-sectional shape provide the bearing stress contact area for the rollers 56 for decreased bearing stress levels; and in addition, improve the bending strength characteristics of the carrier track 55.

While the invention has been disclosed with reference to preferred embodiments, it is to be understood that those modifications and changes which become obvious to a person skilled in the art to which this invention pertains, as a result of the teaching hereof, are considered to be encompassed by the following claims.

I claim:

1. A mechanism for extending and supporting a high-lift device relative to an airfoil, comprising: a carrier track connected to said high-lift device and extending chordwise of said airfoil; track support means secured to said airfoil and being in bearing contact with said carrier track for guiding support thereof; said carrier track being of a slotted I-beam shaped cross section having approximately an I-beam mass distribution and whose web section and lower flange are vertically split and laterally spaced apart forming an inverted U-shaped slot opening along the lower length thereof; rack means mounted within said carrier track slot and fastened along the approximate neutral bending axis of said carrier track; pinion means adapted to meshing engagement with said rack means, between the interior of said carrier track slot, for extending the high-lift device relative to said airfoil; and thereby, increasing the aerodynamic lift characteristics thereof.

2. A mechanism for extending and supporting a high-lift device relative to an airfoil, comprising: a carrier track connected to said high-lift device and extending chordwise of said airfoil; track support means secured to said airfoil and being in bearing contact with said carrier track for guiding support thereof; said carrier track being of a slotted I-beam shaped cross section whose web section and lower flange are vertically split and laterally spaced apart forming an inverted U-shaped channel opening along the lower length thereof; a gear rack mounted within said carrier track channel, with gear teeth facing downwardly, and fastened along the approximate neutral bending axis of said carrier track such that any fatigue crack or failure of said gear rack is substantially isolated from said carrier track; a pinion gear adapted to gear meshing engagement with said gear rack, between the interior of said carrier track channel, for extending the high-lift device relative to said airfoil; and thereby, increasing the aerodynamic lift characteristics thereof.

3. A mechanism for extending and supporting a high-lift device relative to an airfoil, comprising: a carrier track connected to said high-lift device and extending chordwise of said airfoil; track support means secured to said airfoil and being in bearing contact with said carrier track for guiding support thereof; said carrier track being of a slotted I-beam shaped cross section whose web section and lower flange are vertically split and laterally spaced apart forming an inverted U-shaped channel opening along the lower length thereof; rack means comprising a series of rollers mounted within said carrier track channel and axially fastened transverse to said chordwise extending carrier track along the approximate neutral bending axis of said carrier track; pinion means comprising a sprocket adapted to meshing engagement with said series of rollers, between the interior of said carrier track channel, for extending the high-lift device relative to said airfoil; and thereby, increasing the aerodynamic lift characteristics thereof.

4. A mechanism for extending and supporting a high-lift device relative to an airfoil, comprising: a pair of wing ribs spaced apart spanwise and extending chordwise of said airfoil; a set of cylindrical rollers being straddle-mounted between said pair of wing ribs; a carrier track connected to said high-lift device and extending chordwise of said airfoil between said pair of wing ribs; said rollers being positioned above and below said carrier track with their rotational axis aligned transversely with respect to said chordwise extending carrier track for rolling support contact thereof; said carrier track being of a slotted I-beam shaped cross section having approximately an I-beam mass distribution and whose web section and lower flange are vertically split and laterally spaced apart forming an inverted U-shaped slot opening along the lower length thereof; rack means mounted within said carrier track slot and fastened along the web section of said carrier track cross section at the approximate neutral bending axis thereof; pinion means adapted to meshing engagement with said rack means, between the web walls of said carrier track for extending the high-lift device relative to said airfoil; and thereby, increasing the aerodynamic lift characteristics thereof.

5. A mechanism for extending and supporting a high-lift device relative to an airfoil, comprising: a pair of wing ribs spaced apart spanwise and extending chordwise of said airfoil; a set of cylindrical rollers being straddle mounted between said pair of wing ribs; a carrier track connected to said high-lift device and extending chordwise of said airfoil between said pair of wing ribs; said rollers being positioned above and below said carrier track with their rotational axis aligned transversely with respect to said chordwise extending carrier track for rolling support contact thereof; said carrier track being of a slotted I-beam shaped cross section whose web section and lower flange are vertically split and laterally spaced apart forming an inverted U-shaped channel opening along the lower length thereof; a gear rack mounted within said carrier track channel, with gear teeth facing downwardly, and fastened along the web section of said carrier track cross section at the approximate neutral bending axis thereof such that any crack or failure said gear rack is substantially isolated from said carrier track; a pinion gear adapted to gear meshing engagement with said gear rack, between the web walls of said carrier tract, for extending the high-lift device relative to said airfoil; and thereby, increasing the aerodynamic lift characteristics thereof.

6. A mechanism for extending and supporting a high-lift device relative to an airfoil, comprising: a pair of wing ribs spaced apart spanwise and extending chordwise of said airfoil; a set of cylindrical rollers being straddle mounted between said pair of wing ribs; a carrier track connected to said high-lift device and extending chordwise of said airfoil between said pair of wing ribs; said rollers being positioned above and below said carrier track with their rotational axis aligned transversely with respect to said chordwise extending carrier track for rolling support contact thereof; said carrier track being of a slotted I-beam shaped cross section whose web section and lower flange are vertically split and laterally spaced apart forming an inverted U-shaped channel opening along the lower length thereof; rack means comprising a series of rollers mounted within said carrier track channel and axially fastened transverse to said chordwise extending carrier track along the web section of said carrier track cross section at the approximate neutral bending axis thereof such that any fatigue crack or failure of said rack means is substantially isolated from said carrier track; pinion means comprising a sprocket adapted to meshing engagement with said series of rollers, between the web walls of said carrier track, for extending the high-lift device relative to said airfoil; and thereby, increasing the aerodynamic lift characteristics thereof.

7. A mechanism for extending and supporting an auxiliary airfoil relative to a main airfoil for increasing the overall airfoil area, comprising: a carrier track extending fore and aft in said main airfoil and being pivotally connected at one end to said auxiliary airfoil; track support means secured to said main airfoil for guiding support of the other end of said carrier track; said carrier track being of a hat-shaped cross section whose vertically parallel, dual web sections and lower flanges are laterally spaced apart forming an inverted U-shaped channel opening along the lower length thereof, and said hat-shaped cross section having approximately an I-beam mass distribution; rack gear means mounted within said carrier track channel and fastened along the dual web sections of said carrier track hat-shaped cross section at the approximate neutral bending axis thereof such that any fatigue crack or failure of said rack gear means is substantially isolated from said carrier track; pinion gear means positioned within the channel opening between the dual web sections of said carrier track, and adapted to meshing engagement with said rack gear means for moving said carrier track fore and aft to effect relative movement between said auxiliary airfoil and said main airfoil; and said carrier track channel having its sides extending downwardly beyond said interior channel fastened rack gear means such that the inner facing web sections form a raceway for maintaining the pinion gear means in said raceway.

* * * * *